United States Patent
Folliot

(10) Patent No.: US 11,220,193 B2
(45) Date of Patent: Jan. 11, 2022

(54) DEVICE FOR ADJUSTING THE LENGTH OF THE SEAT PORTION OF A MOTOR VEHICLE SEAT WITH CONTROLLED BREAKING

(71) Applicant: FAURECIA Sièges d'Automobile, Nanterre (FR)

(72) Inventor: Dominique Folliot, Saint Georges des Groseillers (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 16/847,022

(22) Filed: Apr. 13, 2020

(65) Prior Publication Data
US 2020/0331362 A1    Oct. 22, 2020

(30) Foreign Application Priority Data
Apr. 16, 2019 (FR) .................................... 19 04044

(51) Int. Cl.
*B60N 2/02* (2006.01)
*B60N 2/427* (2006.01)

(52) U.S. Cl.
CPC ....... *B60N 2/0284* (2013.01); *B60N 2/42709* (2013.01); *B60N 2/42754* (2013.01)

(58) Field of Classification Search
CPC .............. B60N 2/42754; B60N 2/0284; B60N 2/42709; B60N 2002/0236; B60N 2/06; B60N 2/0722; B60N 2/22
USPC ............... 297/216.1, 216.18, 362.14, 284.11
See application file for complete search history.

(56) References Cited

U.S. PATENT DOCUMENTS

| | | | | |
|---|---|---|---|---|
| 1,838,605 | A | * 12/1931 | Youlten | F16B 39/38 411/277 |
| 8,662,805 | B2 | * 3/2014 | Schaeffer | F16B 31/021 411/3 |
| 8,888,181 | B2 | * 11/2014 | Perraut | B60N 2/1803 297/284.11 |
| 2016/0090010 | A1 | * 3/2016 | Line | B60N 2/0284 297/284.3 |
| 2016/0288752 | A1 | 10/2016 | Stancato | |
| 2017/0136919 | A1 | 5/2017 | Deppe | |

FOREIGN PATENT DOCUMENTS

| CN | 210066737 U | * | 2/2020 | |
|---|---|---|---|---|
| DE | 10353245 A1 | | 6/2005 | |
| DE | 102011051718 A1 | | 1/2013 | |
| EP | 3346146 A1 | * | 7/2018 | ............ F16B 13/065 |
| JP | 11151958 A | | 6/1999 | |

OTHER PUBLICATIONS

French Search Report for FR1904044 dated Apr. 12, 2019, BE 1200050 FR, 8 pages, (No English Translation Available).

* cited by examiner

*Primary Examiner* — Milton Nelson, Jr.
(74) *Attorney, Agent, or Firm* — Barnes & Thornburg LLP

(57) ABSTRACT

A device for adjusting the length of the seating portion of a motor vehicle seat, the seating portion comprising a movable seating part, the adjustment device comprising a threaded rod, a rotating nut, and a housing receiving the nut and the threaded rod, the threaded rod comprising a first end in connection with the movable seating part and a second end opposite the first end, the threaded rod and the nut cooperating in rotation to move the movable seating part, wherein the nut comprises a nut weakness area for the breaking of said nut.

11 Claims, 6 Drawing Sheets

US 11,220,193 B2

DEVICE FOR ADJUSTING THE LENGTH OF THE SEAT PORTION OF A MOTOR VEHICLE SEAT WITH CONTROLLED BREAKING

PRIORITY CLAIM

This application claims priority to French Patent Application FR 19 04044, filed Apr. 16, 2019, which is expressly incorporated by reference herein.

BACKGROUND

The present disclosure relates to a device for adjusting the length of the seating portion of a motor vehicle seat, to a seating portion of a motor vehicle seat, and to a motor vehicle seat comprising such a device.

SUMMARY

According to the present disclosure, a device for adjusting the length of the seating portion of a motor vehicle seat comprises a seating portion comprising a movable seating part, the adjustment device comprising a threaded rod, a rotating nut, and a housing receiving the nut and the threaded rod. The threaded rod comprising a first end in connection with the movable seating part and a second end opposite the first end, the threaded rod and the nut cooperating in rotation to move the movable seating part, wherein the nut comprises a nut weakness area for the breaking of said nut.

In illustrative embodiments, the threaded rod is rotated by the nut to move the movable seating part.

In illustrative embodiments, the nut comprises a hub in contact with the threaded rod and an outer ring, the ring and hub being connected by an intermediate part, the intermediate part comprising the nut weakness area.

In illustrative embodiments, the nut weakness area has a breaking point beyond which the nut breaks, the breaking point corresponding to a force applied to the first end of the threaded rod in the longitudinal direction of said threaded rod, the breaking point being between about 1,500 N and 2,500 N.

In illustrative embodiments, the housing comprises a housing weakness area for the breaking of said housing.

In illustrative embodiments, the housing comprises a first opening and a second opening, the threaded rod passing through the housing via the first opening and second opening such that the first opening of the housing is towards the first end of the threaded rod and the second opening of the housing is towards the second end of the threaded rod, and wherein the housing weakness area is located at the second opening.

In illustrative embodiments, the housing weakness area has a breaking point beyond which the housing breaks, the breaking point corresponding to a force applied to the first end of the threaded rod in the longitudinal direction of said threaded rod, the breaking point being between about 1,500 N and about 2,500 N.

In illustrative embodiments, the breaking point is between about 1,800 N and 2,200 N.

In illustrative embodiments, the threaded rod is made of rigid metal.

In illustrative embodiments, a seating portion of a motor vehicle seat is proposed that comprises a movable seating part and comprising an adjustment device as described above.

In illustrative embodiments, a motor vehicle seat comprising a seating portion as described above is proposed.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
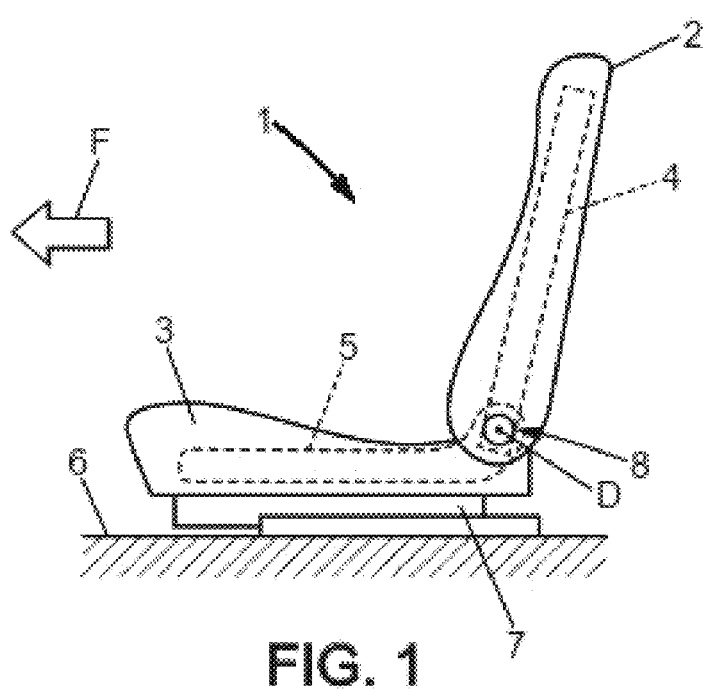
FIG. 1 is a schematic side view of a motor vehicle seat provided with a device for adjusting the length of the seating portion.

FIG. 1 illustrates a motor vehicle seat 1. The seat 1 has a backrest 2 and a seating portion 3. The backrest 2 has a backrest frame 4. The seating portion 3 has a seating portion frame 5. The backrest frame 4 is mounted on the seating portion frame 5, substantially in a connection pivoting about a horizontal axis D. The seating portion frame 5 may itself be mounted on the floor 6 of the motor vehicle, by example by means of rails 7. A hinge device 8 enables adjusting the tilt angle of the backrest frame 4 with respect to the seating portion frame 5, and locking the tilt angle of the backrest frame 4.

Figure 2:
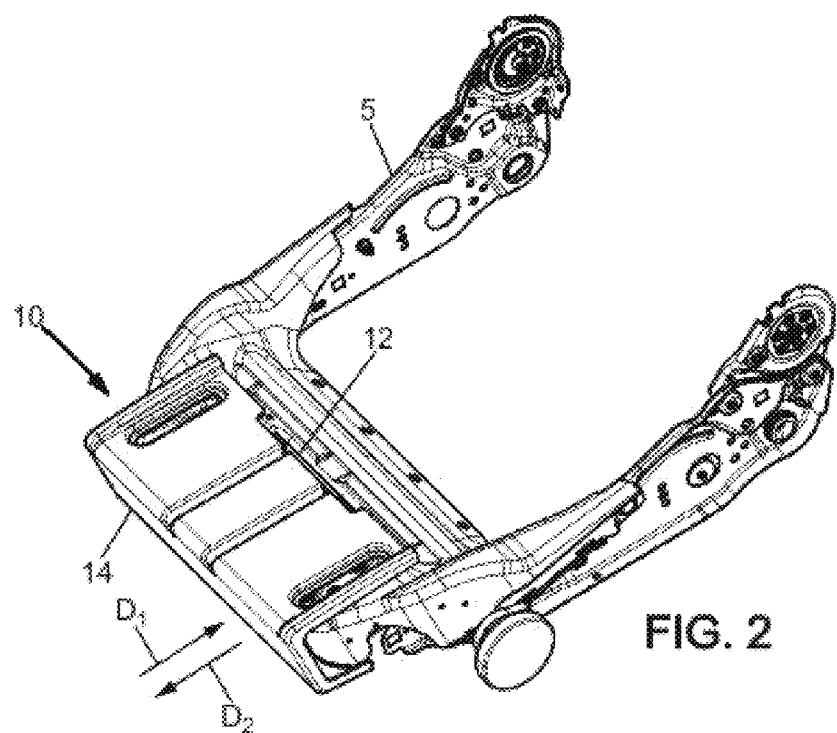
FIG. 2 is a perspective view of details of the seating portion frame of the seat of FIG. 1.

As illustrated in FIG. 2, the seating portion frame 5 here is provided with: a framework 12, fixed for example on the movable metal sections of the rails 7, a movable seating part 14, for example a seat nose forming the front part of the seating portion frame 5, mounted to move in translation in two opposite directions D1, D2, relative to the framework 12. Direction D2 here corresponds to a direction towards the front of the seat (away from the backrest) and direction D1 corresponds to a direction towards the rear of the seat (towards the backrest).

The movable seating part 14 is illustrated in FIG. 2. In FIG. 2, only the frame of the movable seating part 14 is shown. The movable seating part 14 may comprise, in addition to this frame, padding and/or a cover and/or any other element improving the comfort of a user of the seating portion 3.

The seating portion frame 5 further comprises a device 10 for adjusting the length of the seating portion 3. This adjustment device 10 is connected to the movable seating part 14 and to the framework 12. The adjustment device 10 is illustrated in a sectional view in FIG. 3. The device for adjusting the length of the seating portion 10 essentially comprises a threaded rod 16, a nut 18, and a housing 24.

The threaded rod 16 comprises a first end 16A and a second end 16B opposite the first end 16A. The threaded rod 16 is in connection with the movable seating part 14. More specifically, the first end 16A is in direct connection with the movable seating part 14. It is therefore the movement of the threaded rod 16 which causes the movement of the movable seating part 14.

The threaded rod 16 extends longitudinally in the longitudinal direction L. In addition, the threaded rod 16 comprises an intermediate part 16C. The intermediate part 16C comprises the thread. The intermediate part 16C extends longitudinally along direction L between the first end 16A and the second end 16B.

According to one example, the threaded rod 16 is made of metal. In one example, the threaded rod 16 is made of rigid metal. The term "rigid metal" is understood here to mean a metal such that the threaded rod 16 does not bend in the event of an impact or bump on the movable seating part 14. For example, the metal used is a metal having a Young's modulus between about 180 GPa and about 230 GPa. For example, the metal used is stainless steel.

Figure 3:
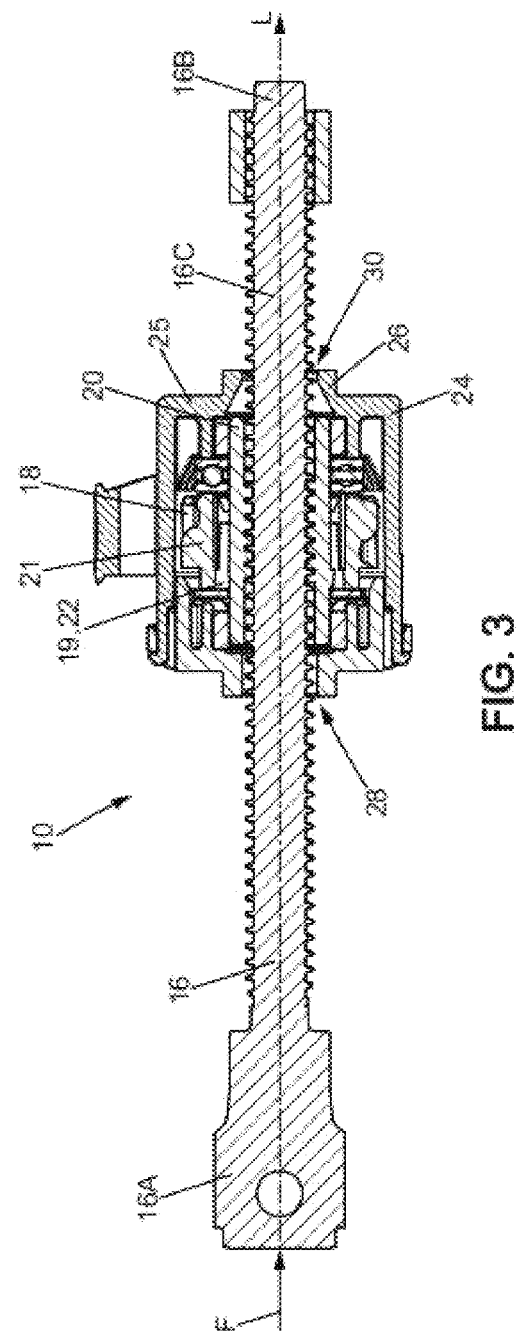
FIG. 3 shows a sectional view along the longitudinal axis of the threaded rod of the device for adjusting the length of the seating portion.
Figure 4:
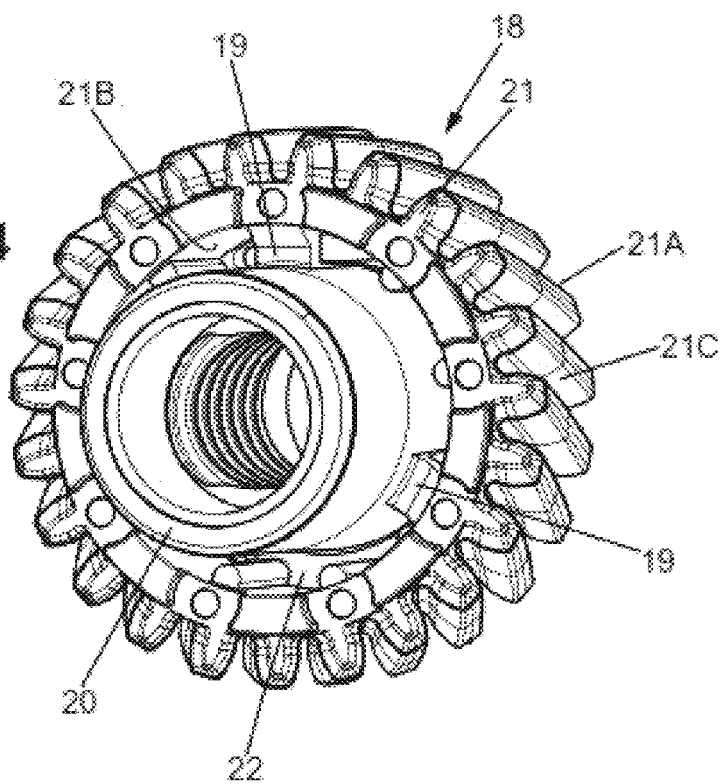
FIG. 4 shows a perspective view of the nut comprised in the device for adjusting the length of the seating portion.
Figure 5:
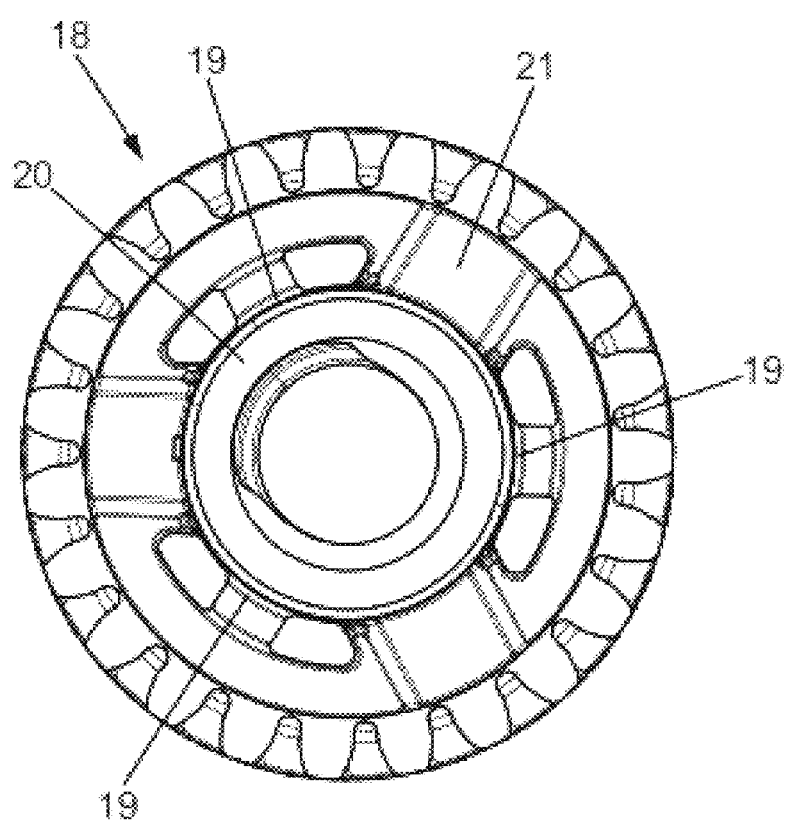
FIG. 5 shows a front view of the nut of FIG. 4.

The nut 18 is illustrated in detail in FIG. 4 and FIG. 5. The nut is for example made of plastic. The nut 18 comprises a hub 20 and an outer ring 21. The hub 20 is in contact with the threaded rod 16. The hub 20 is generally cylindrical in shape, and extends longitudinally. In addition, the hub 20 comprises a thread complementary to that of the threaded rod 16. More specifically, the threaded rod 16 and the nut 18 cooperate in rotation to move the movable seating part 14. According to a first alternative, the nut 18 is rotated by the threaded rod 16 to move the movable seating part 14. According to a second preferred alternative, illustrated for example by FIG. 3, the threaded rod 16 is rotated by the nut 18 to move the movable seating part 14.

The ring 21 is generally cylindrical in shape and extends along an axis identical to the axis of the hub 20. As the diameter of the ring 21 is greater than the diameter of the hub 20, the ring 21 surrounds the hub 20. The ring 2 is therefore external to the hub 20. In addition, the ring 21 comprises an outer surface 21A and an inner surface 21B. The outer surface 21A comprises teeth 21C for engaging with the housing 24. In other words, the ring 21 is in contact with the housing 24. The inner surface 21B faces the hub 20. The hub 20 and the inner surface 21B of the ring 21 are connected by one or more intermediate part(s) 22.

According to the example illustrated in FIG. 4 and FIG. 5, the hub 20 and the ring 21 are connected by three intermediate parts 22. According to another example, the number of intermediate parts 22 is two. However, a number of intermediate parts 22 greater than three can be considered, for example such as four or five intermediate parts. In the example of FIG. 5, the three intermediate parts 22 are distributed uniformly between the hub 20 and the ring 21. More specifically, each intermediate part 19 is angularly spaced apart by 120 degrees.

Each intermediate part 22 comprises a nut weakness area 19. The nut weakness area 19 is capable of causing the nut 18 to break. For this purpose, the nut weakness area 19 is wide enough to hold together the hub 20 and the ring 21 of the nut 18, and thin enough to break under a predetermined force. More specifically, the nut weakness area 19 has a nut breaking point. The breaking point corresponds to a force F beyond which the nut 18 breaks, the force F being applied to the first end of the threaded rod 16A along the longitudinal direction L of said threaded rod, as illustrated in FIG. 3. More specifically, by applying force F on the first end 16A of the threaded rod 16, the nut weakness area(s) 19 break(s). As a result, the hub 20 and the ring 21 are separated from one another. Furthermore, the hub 20 remains in contact with the threaded rod 16, by means of their respective threads. The breaking point is for example between about 1,500 N and about 2,500 N. According to another example, the breaking point is between about 1,800 N and about 2,200 N. According to yet another example, the breaking point is about 2,000 N.

Figure 6:
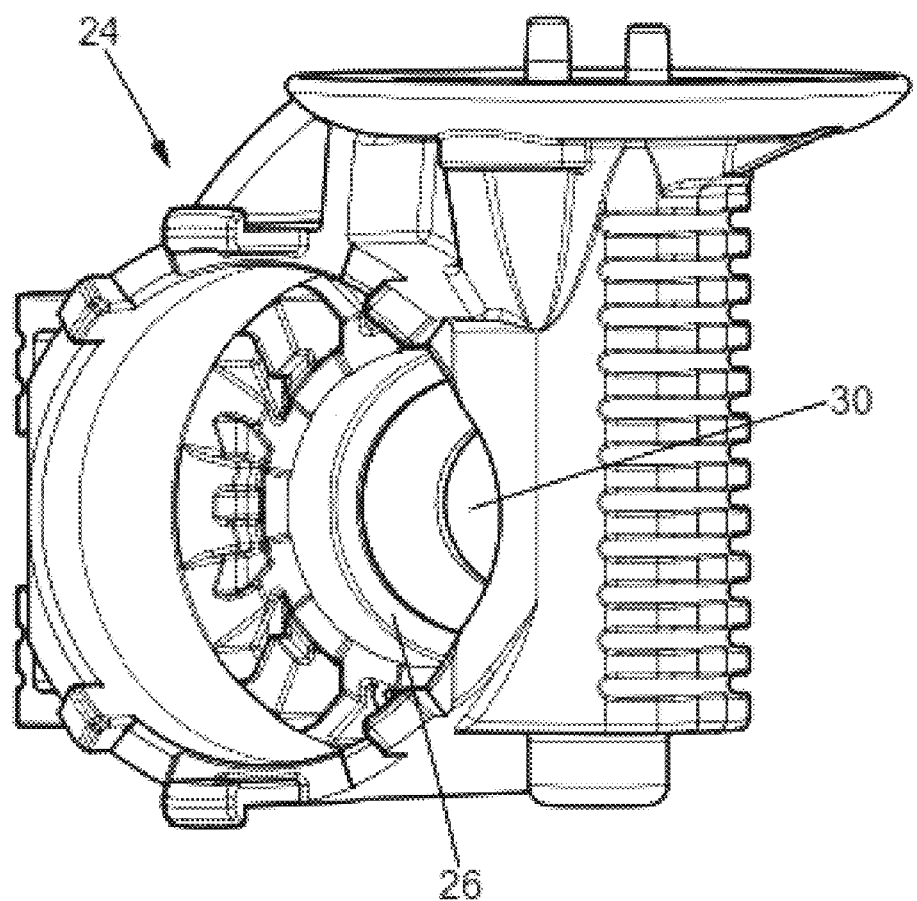
FIG. 6 shows a perspective view of a portion of the housing comprised in the device for adjusting the length of the seating portion.

The housing 24 is illustrated in part in FIG. 3 and FIG. 6. The housing 24 receives the nut 18 and a portion of the intermediate part 16C of the threaded rod 16. The housing 24 thus serves in particular to protect the assembly formed by the nut 18 and the threaded rod 16. A portion of the housing 24 is engaged with the teeth 21C of the nut 18 (not shown), to allow rotation of the nut 18 on the intermediate part 16C of the threaded rod 16 and thereby causing displacement of the threaded rod 16 in its longitudinal direction L. The housing 24 comprises a first opening 28 and a second opening 30. The first opening 28 is located towards the first end 16A of the threaded rod 16. The second opening 30 is located towards the second end 16B. As illustrated in FIG. 3, the threaded rod 16 passes through the housing 24 via the first opening 28 and second opening 30.

FIG. 6 illustrates the portion of the housing 24 which comprises the second opening 30. The second opening 30 is in the form of a cone, meaning it extends longitudinally along the threaded rod 16. In this FIG. 6, one can see that the housing 24 comprises a housing weakness area 26. The housing weakness area 26 corresponds to the area located between the opening 30 and the rest of the housing 24. More specifically, the housing weakness area 26 corresponds to the portion located between the opening 30 and a radial portion 25 of the housing 24 which extends radially (perpendicularly) relative to the cone formed by the opening 30. The housing weakness area 26 is capable of causing the housing 24 to break. For this purpose, the housing weakness area 26 is thick enough to hold the radial portion 25 and the opening 30 together, and thin enough to break under a predetermined force. More specifically, the housing weakness area 26 has a housing breaking point 26. The housing breaking point 26 corresponds to the force F applied to the first end 16A of the rod, as illustrated in FIG. 3. The radial portion 25 and the opening 30 are separated from one another as a result.

In the event of an impact, the operation of the device for adjusting the seating portion length 10 is as follows. During an impact, in other words in the event of a blow at the rear of the vehicle, for example from the rear towards the front of the vehicle in the normal direction of movement of the vehicle, a person sitting on the seat is pushed further back into the seating portion 3 of the seat (towards the backrest). By this movement, the person applies force on the movable seating part 14, for example with his or her calves. When this force is equal to force F, the device 10 disengages. More specifically, the disengagement occurs according to the following sequence: the threaded rod 16 moves in its longitudinal direction L from the first end 16A towards the second end 16B, the nut 18 breaks in its nut weakness area 19, the threaded rod 16 and the hub 20 of the nut 18 move in the longitudinal direction L, the hub 20 abuts against the cone of the opening 30 of the housing 24, and the housing 24 breaks in its housing weakness area 26.

By this disengagement, the movable seating part 14 moves in translation in direction D1 (towards the backrest). Because the nut 18, threaded rod 16, and housing 24 of the device 10 have separated, in this case it is no longer possible for the movable seating part 14 to move in translation in direction D2. In addition, if the movable seating part 14 were to move in translate in direction D2 while the person is being pushed further back into the seat, the contact between the two could injure the person, particularly at the knees. The disengagement thus avoids this type of injury.

In the automotive field, a seat of a motor vehicle may be equipped with a device for adjusting the length of the seating portion. Such a device for adjusting the length of the seating portion may comprise a seating portion that is movable in translation in the direction of the seating portion length, relative to a framework fixed on the seating portion frame or formed by this seating portion frame.

This device increases the comfort of a person seated on the seat. In some instances, a comparative device may cause impact and/or injury to the seated person. For example, in the event of an impact at the rear of the vehicle, it has been observed that the comparative adjustment device can cause a complete translational movement of the seating portion, which itself can lead to an impact on the seated person, particularly at the calves or knees.

The invention claimed is:

1. An adjustment device for adjusting a length of a seating portion of a motor vehicle seat, the seating portion having a movable seating part, the adjustment device comprising
   a threaded rod,
   a rotating nut, and
   a housing receiving the nut and the threaded rod, the threaded rod comprising a first end adapted for connection with the movable seating part and a second end opposite the first end, the threaded rod and the nut cooperating in rotation to move the movable seating part,
   wherein the nut comprises a nut weakness area for the breaking of the nut.

2. The adjustment device of claim 1, wherein the threaded rod is rotated by the nut to move the movable seating part.

3. The adjustment device of claim 1, wherein the nut comprises a hub in contact with the threaded rod and an outer ring, the ring and the hub being connected by an intermediate part, the intermediate part comprising the nut weakness area.

4. The adjustment device of claim 1, wherein the threaded rod is made of rigid metal.

5. The adjustment device of claim 1, wherein the housing comprises a housing weakness area for the breaking of said housing.

6. The adjustment device of claim 5, wherein the housing comprises a first opening and a second opening, the threaded rod passing through the housing via the first opening and second opening such that the first opening of the housing is towards the first end of the threaded rod and the second opening of the housing is towards the second end of the threaded rod, and wherein the housing weakness area is located at the second opening.

7. The adjustment device of claim 5, wherein the housing weakness area has a breaking point beyond which the housing breaks, the breaking point corresponding to a force applied to the first end of the threaded rod in the longitudinal direction of said threaded rod, the breaking point being between about 1,500 N and about 2,500 N.

8. The adjustment device of claim 1, wherein the nut weakness area has a breaking point beyond which the nut breaks, the breaking point corresponding to a force applied to the first end of the threaded rod in the longitudinal direction of said threaded rod, the breaking point being between about 1,500 N and about 2,500 N.

9. The adjustment device of claim 8, wherein the breaking point is between about 1,800 N and about 2,200 N.

10. A seating portion of a motor vehicle seat, comprising a movable seating part and comprising an adjustment device according to claim 1.

11. A motor vehicle seat comprising a seating portion according to claim 10.

* * * * *